A. W. FEES.
HOT BLAST LIQUID AND GASEOUS FUEL BURNER.
APPLICATION FILED JAN. 12, 1911.

1,016,257.

Patented Feb. 6, 1912.

2 SHEETS—SHEET 1.

Witnesses:
George A Snowdon
Burl Vaughan.

Inventor:
Arthur W. Fees,
By Lou. Vaughan,
his Attorney.

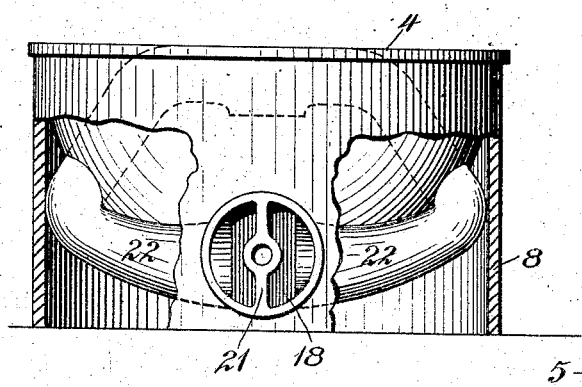
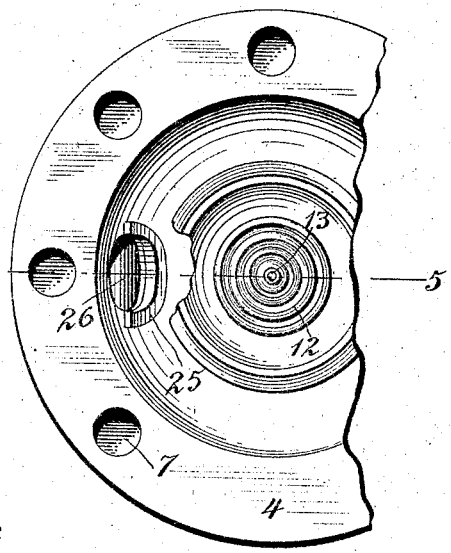
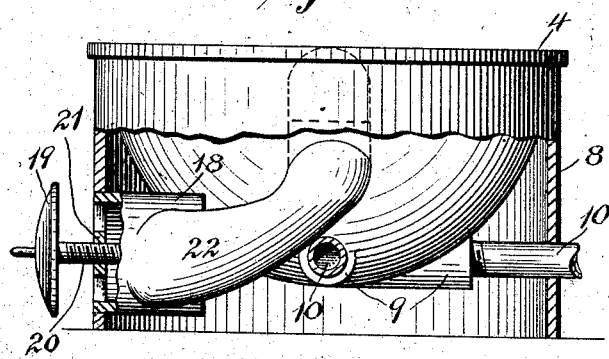
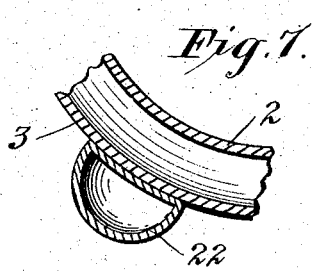
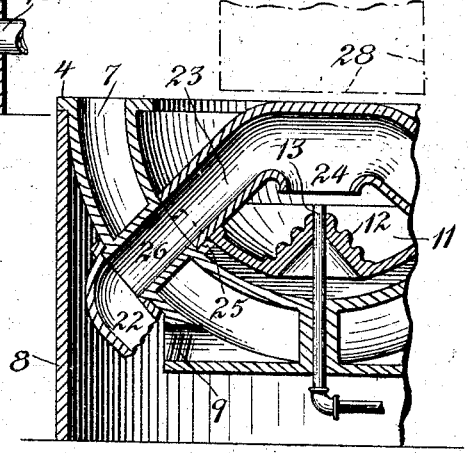

UNITED STATES PATENT OFFICE.

ARTHUR W. FEES, OF BLAIR, NEBRASKA.

HOT-BLAST LIQUID AND GASEOUS FUEL BURNER.

1,016,257.     Specification of Letters Patent.     Patented Feb. 6, 1912.

Application filed January 12, 1911. Serial No. 602,235.

*To all whom it may concern:*

Be it known that I, ARTHUR W. FEES, a citizen of the United States of America, residing at Blair, in the county of Washington and State of Nebraska, have invented certain new and useful Improvements in Hot-Blast Liquid and Gaseous Fuel Burners, of which the following is a specification.

My invention relates to improvements in hot-blast liquid or gaseous fuel burners employed in conjunction with ordinary boiler structures for heating water supply or producing vapor or steam; and the objects of my improvement are, first, to as completely surround the fire by the water to be heated as is consistent with the application care and operation of the burner and thereby increase the area of heating surface above that of heaters now in use, without making a proportional increase in the size or height of the fire-box and boiler; second, to provide a hot-blast to the burner having ducts ascendant throughout their lengths and increasingly heated from the fresh air intake to their discharge into the flame of the burner; third, to provide a fire-box for the burner having its walls and bottom of double thicknesses spaced apart to receive throughout an interposed sheet or body of water in communication, through the connected boiler structure, with a whole circulatory water system; fourth, to provide a still hot air space insulation of the walls and bottom of the burner fire-box and a primary heating chamber for all immediate connections thereto; fifth, to expose the entire inner wall and inner bottom of the fire-box to the direct action of the hot gases of the combustion chamber; sixth, to reduce to the minimum the direct contact of the burner generating pan or tray with the walls or bottom of the fire-box; and, seventh, to provide a burner structure that may be substituted for the usual fire-pot, grate and ash-pit to reduce the boiler height to facilitate efficient instalment in low basement stories and dispose the boilers of steam locomotives and traction engines at lower altitudes and thereby reduce their topheaviness. These with other minor objects hereinafter more particularly described I attain by the structure illustrated in the accompanying drawings in which—

Figure 1:
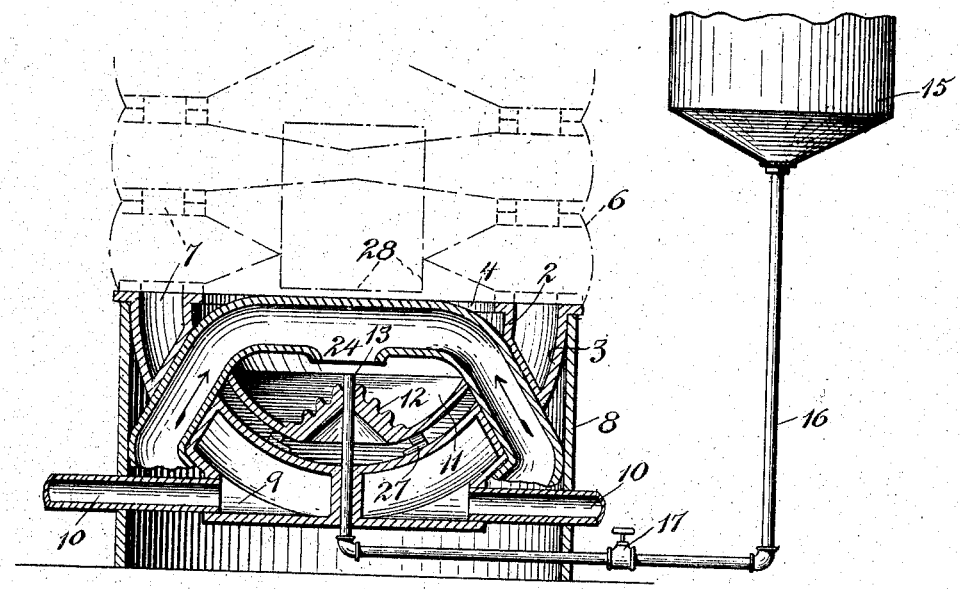
Figure 2:
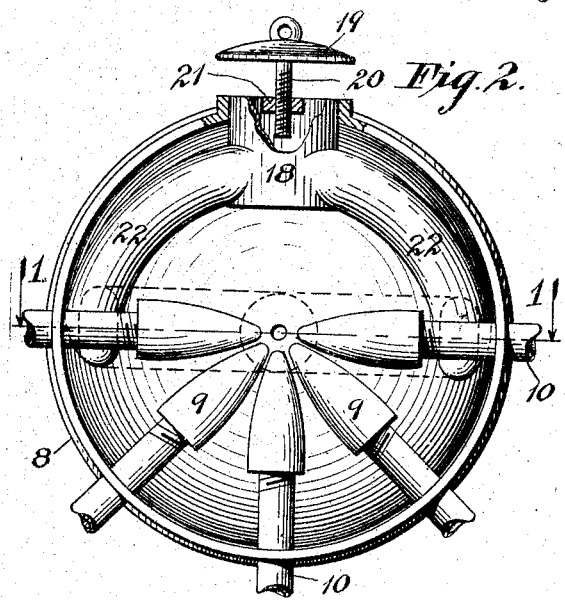
Figure 4:
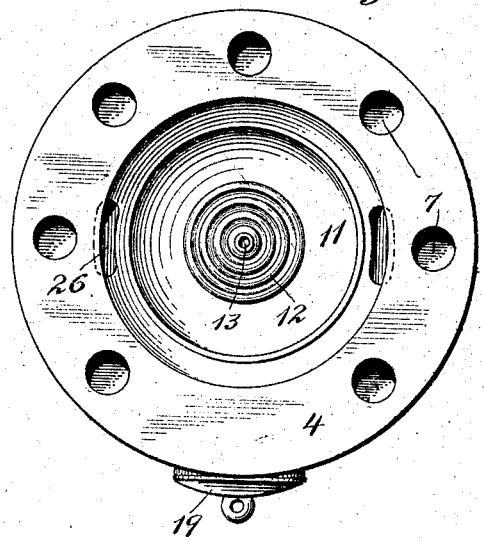

Figure 1 is a vertical sectional elevation on the broken line 1 of Fig. 2; Fig. 2, a bottom or underside view with portions cut away to disclose the outer air inlet to the hot-blast; Fig. 3, a front elevation having parts of the vertical outer casing cut away to show the outside of the fire-box and conjunct branches of the hot-blast duct the inlet closure of which is here removed; Fig. 4, a top view of the fire-box of the burner with the arch of the hot-blast pipe removed; Fig. 5, an abridged vertical section, similar to Fig. 1, taken on the broken line 5 of Fig. 6, illustrating a preferred manner of connecting the hot-blast pipe through the walls of the fire-box; Fig. 6, a top view of Fig. 5, with the separable arch of the hot-blast pipe removed; Fig. 7, a sectional view showing a cross-section of one of the outer branches of the hot-blast duct and illustrating its conjunct relation to the outer wall of the fire-box; and Fig. 8, a side elevation, at right angles to Fig. 3, with the lower portion of the vertical casing cut away and parts removed showing the outer wall of the fire-box and one conjunct branch of the hot-blast duct. In all of which views similar reference numerals refer to like parts.

Combustion of almost any solid fuel, such as coal and wood, results in a large bulk of ashes requiring greater depth of fire-pot or a too frequent cleaning of the grate; also additional space below the grate, the ash-pit, is required for the temporary storage and removal of such residue. While the incombustible mineral residue from most any liquid or gaseous fuel is so small as to require no allowance of room for it in the furnace of an ordinary water heater or steam-boiler. Therefore, in my improvement I have utilized this ash-space to decrease the whole height by supplying a lower fire-base burner or furnace adaptable for connection with and the support of any ordinary hot-water, vapor or steam boiler structure to be heated by a liquid or gaseous fuel.

To more specifically disclose the manner and means by which I attain the objects above mentioned, attention is first directed to one of the principal elements in my contrivance:—The burner fire-box by which I have elected to illustrate my invention, consists of the inner bowl 2 and a larger outer bowl 3, concentrically disposed, spaced apart throughout to form double or hollow bottom and side walls and having a horizontal rim 4 common to both bowls and uniting their top edges. This rim is generally made level on top to receive any ordinary boiler superstructure, as indicated by the broken lines 6 in Fig. 1, and has the series of vertical apertures 7 rendering the space between the bowls communicable with the water-space of such a connected boiler structure. And the outer edge of the rim projects to form an annular flange to engage the top edge of the vertical base casing 8, which supports the whole upon any suitable floor foundation or carriage.

The tangential radially disposed bosses 9 are integral parts of the bottom of the outer wall or bowl and tapped to receive the ends of the condensed steam or cooled water return pipes 10 at the lowest part of a circulatory water-heating or steam system of which the connected boiler is a part.

While my burner is adaptable to use with any liquid or gaseous fuel, I have elected to illustrate its application as a crude oil burner, with the rather proportionately large generating pan 11 having centrally therein an integral corrugated heating or combustion cone 12 through the crater of which the oil jet pipe 13 projects upwardly. A centrally disposed tubed aperture through the bottom of the fire-box receives this pipe, the lower end of which is connected with the elevated reservoir 15 through the supply pipe 16 having a valve 17 to control the flow of liquid fuel.

The hot-blast to supply the burner with hot air to facilitate the vaporization and combustion of the fuel comprises the inlet tube 18 having the outer adjustable closure 19 mounted on the outer end of the threaded stem 20 disposed through the cross-bar 21. The connected branch ducts 22 and 22 are disposed oppositely therefrom ascending backwardly along the outer wall of the firepot, against which they are shaped to fit as shown in Fig. 7. At points directly opposite and about half way up the sides of the fire-pot they are bent to form the convergent portions 23 and 23 disposed inwardly and upwardly through the tubed openings 26 in the walls of the fire-box and terminating in the centrally downwardly directed discharge opening 24 directly over the fuel jet. As shown in Fig. 5, the arched section 23 of this duct standing within the upper part or combustion chamber of the fire-bowl, is preferably made separable, supported at its ends by the half-socket lugs 25 at the lower edges of the tubed openings 26 through the walls of the fire-box.

The half-socket lugs also serve to support the opposite edges of the generating pan which may also have the supporting legs 27 shown in Fig. 1, to effect a space between the pan and the bottom of the inner bowl, for the free circulation of the heated gases in the combustion chamber.

In the application of my invention as here set forth, the usual fire or stoking door in the boiler structure, indicated by the broken lines 28 in Figs. 1 and 5, renders the combustion chamber of the fire-bowl and imposed boiler structure accessible for the care and operation of the burner and removing the hot-blast arch.

The fire-base casing 8 is of a height only sufficient to accommodate the connection of the inner ends of the return water pipes to the base of the fire-box, to allow the convenient connection of the fuel supply pipe and required disposition of the hot-blast inlet duct and branch ducts as shown. This casing is made tight to form a still hot air space insulation and heating chamber around and under all these elements, as well as around and under the fire-box, which is surrounded and supported by this casing, as shown.

In operation, when starting, first a small amount of fuel is fed into the pan through the supply pipe and then ignited; the adjustable closure of the hot-blast inlet being nearly closed, admitting only enough fresh air to allow the fuel to burn but not to blow the flame away from the generating pan. As the generating pan and combustion cone are spaced away from the base of the firebox, they are soon brought to the required temperature to vaporize the fuel. Otherwise, if the pan and cone were placed close down to the bottom of the combustion chamber in my fire-box, as heretofore done in placing liquid fuel burners in old boiler fire-boxes, perfect combustion could not be attained unless the whole connected circulatory water system was brought up to nearly the required temperature of the generating pan, which is impractical. Further, it would make starting very slow, the vaporization and combustion of the fuel generally imperfect and the plant slow to respond to regulation and control. When the pan and whole burner reaches the desired generating and working temperature, the required fuel supply is regulated by the valve in the supply pipe, and a proper balance of hot-blast is adjusted by the adjustable inlet closure. Further, with the generating pan and other parts of the burner disposed as shown, the hot gases and flame of the combustion chamber, spread by the meeting forces of the vaporized fuel and hot-blast, reach the whole inner surface of the fire-box, including its inner bottom, imparting the heat directly to the cooler base of the circulatory water system as it arrives through the return pipes.

The still air space of the fire-base chamber not alone serves to insulate the outer wall and water base of the fire-box from the outer air, but, a large per cent. of the heat here radiated from the fire-box is imparted to the inclosed ends of the return pipes, thereby starting the heating action at once at the lowest point in the system. The fuel supply is advantageously warmed in that part of the supply pipe disposed through this hot air insulation chamber; which pipe, for the more sluggish crude oils may be formed into a coil to increase its length in this chamber before passing through the hotter water-bottom to the terminal jet in the still hotter combustion chamber above. And the hot-blast duct inlet and branches were first warmed as they enter this heating chamber; which warming is supplemented by their conjunct positition in contact with the outer hot wall of the fire-box. As these branches ascend they are continually coming into a hotter zone, to expand and accelerate the current or the blast; which current is finally passed upwardly and inwardly through the walls of the fire-box to be more intensely heated and discharged downwardly with its accumulated heat and force into the flame of the burner. This hot-blast is assisted by the usual exhaust passage from the combustion chamber through and to a remote part of the boiler structure, and is then usually connected with an exhaust stack or the flue of some chimney.

I claim:

1. A liquid or gaseous fuel burner, comprising an uncapped open-topped hemispherical fire-box or fire-bowl having an outwardly turned rim to form a suspension flange, a vertical cylindrical casing disposed to seat said flange and suspend said fire-bowl within said cylindrical casing, a still air insulation and heating-chamber around and beneath said fire-bowl inside of said casing, and a fuel supply pipe disposed through said heating-chamber and having a terminal jet in said fire-bowl.

2. A liquid or gaseous fuel burner, comprising an uncapped fire-box or fire-bowl open at the top and having an outwardly projecting suspension flange at the rim, an outer casing having a top edge disposed to engage said flange to support said fire-box and inclose a still air insulation and heating-chamber around and thereunder, a generating-pan in said fire-box, and a liquid fuel supply pipe disposed through said heating-chamber and the wall of said fire-box and terminated by a jet in said generating-pan.

3. A liquid or gaseous fuel burner, comprising a hemispherical fire-box or bowl having an outwardly disposed annular flange at its rim, a vertical cylindrical casing of greater height than said fire-bowl to seat said annular flange on its top edge, suspend the fire-bowl within the cylindrical casing and form a still air insulation and heating chamber around and thereunder, a generating-pan disposed within and spaced above the bottom of said bowl, and a fuel supply pipe disposed through said still air heating chamber and upwardly through the bottom of said bowl and having a terminal jet in said generating-pan.

4. A liquid or gaseous fuel burner, comprising an uncapped open-topped fire-bowl having a double wall consisting of inner and outer bowls disposed concentrically apart to form a space therebetween and having common to both bowls a connecting rim of greater outer diameter to form an annular outwardly projecting flange at the top of the outer bowl and having openings through said rim into said space between the bowls adapted to connect said intervening space with the water-space of a superimposed boiler, a casing to form a supporting seat for said annular flange, a still air insulating and heating chamber within said casing and around and beneath the fire-bowl, and a fuel supply pipe disposed through said still air insulation and heating chamber and double wall and having a terminal jet in the fire-bowl.

5. A liquid or gaseous fuel burner, comprising an uncapped open-topped fire-bowl adapted to be communicably connected with the heat chamber of a boiler and having double walls consisting of an inner bowl and a larger like-shaped outer bowl disposed concentrically with space between to form a water-chamber in said walls, a rim common to both bowls and projected annularly to form a suspension flange at the top of the outer bowl and having vertical openings to communicably connect said water-chamber with the water-space of said connected boiler, a tapped opening through the base of said outer bowl to communicably connect the end of a return water pipe with the bottom of said water-chamber, a casing to seat said suspension flange and suspend said fire-bowl within said casing, a still air insulating and heating chamber inclosed around and beneath said fire-bowl by said casing, and a fuel supply pipe disposed through said heating chamber and through said water-chamber and having a terminal jet in said fire-bowl.

6. A hot-blast liquid or gaseous fuel burner, comprising an open-topped fire-bowl adapted to be subjacently and unrestrictedly communicably connected with a boiler heat-chamber, a fuel supply pipe having a terminal jet in said fire-bowl, and a hot-blast duct disposed ascendantly and conjunctly on the outside of said fire-bowl and through the wall thereof and having a terminal discharge-opening therein.

7. A hot-blast liquid or gaseous fuel burner, comprising an open topped fire-bowl having double walls spaced apart to form an intervening water-chamber around and beneath the inner wall and rim perforations opening into said chamber and said fire-bowl adapted to serve as a bottom to the combustion or heat-chamber of a superimposed boiler and said water-chamber adapted to be communicably connected through said rim perforations with the water-space of such boiler, a fuel supply pipe disposed through said water chamber and having a terminal jet in the fire-bowl, and a hot-blast duct fitted and disposed conjunctly to the outside of the outer wall of said fire-bowl thence through said walls and water-chamber and having a terminal discharge-opening in said fire-bowl.

8. A hot-blast liquid or gaseous fuel burner, comprising an uncapped open topped fire-box having an outwardly turned rim to form a suspension flange, a surrounding casing to form a supporting seat for said flange, a still air insulation and heating-chamber within said casing and around and beneath said fire-box, a fuel supply pipe disposed through said heating-chamber and having a terminal jet in said fire-box, and a hot-blast duct disposed through said heating-chamber and into said fire-box and terminated in a downwardly-directed discharge-opening over the terminal jet of said fuel pipe.

9. A hot-blast liquid or gaseous fuel burner, comprising an uncapped open-topped hemispherical fire-bowl having an outwardly turned rim to form a suspension flange, a vertical cylindrical casing disposed beneath to form a supporting seat for said flange to suspend said fire-bowl within the casing, a still air insulation and heating-chamber around and beneath said fire-bowl and inclosed by said casing, a fuel supply pipe disposed through said heating-chamber and having a terminal jet in said fire-bowl, a hot-blast air inlet through said casing, and divergent branch ducts leading from said inlet ascendantly and conjunctly along the outer bottom and sides of said fire-bowl within said heating-chamber and convergently upward through opposite walls of said bowl and united in a downwardly-disposed discharge-opening over said terminal jet.

10. A hot-blast liquid or gaseous fuel burner, comprising an uncapped open topped fire-bowl having an outwardly turned rim to form a suspension flange, a generating-pan disposed in said fire-bowl with an intervening open space between the bottom of the pan and the bottom of the bowl, a casing to seat said suspension flange to support the fire-bowl, a still air insulating and heating-chamber around and beneath said fire-bowl, a fuel supply pipe disposed through said heating-chamber and through the bottom of said fire-bowl and having a terminal jet disposed upwardly through the bottom of and into said generating-pan, a hot-blast duct having a valved air inlet and ascendant branch ducts through said heating-chamber to opposite sides of the fire-bowl and communicably connected through the walls of said fire-bowl with a duct spanning the fire-bowl and having a downwardly-directed discharge-opening above said generating-pan and fuel jet.

11. A hot-blast liquid or gaseous fuel burner, comprising an open-topped water-jacketed fire-bowl having a perforate rim with an outward extension to form an annular suspension flange and adapted to be disposed subjacently to a boiler structure to render the fire-space of the bowl communicable through its open top with the heating-chamber of said boiler and the water-jacket communicable through the rim perforations with the water-space of said boiler, a casing to support said suspension flange, a still air insulation and heating-chamber around and beneath said fire-bowl, a fuel supply pipe disposed through said heating-chamber and having a terminal jet in said fire-bowl, and a hot-blast duct leading from an exterior air-inlet through said casing, heating-chamber and water-jacketed wall of the fire-bowl and having a terminal discharge-opening in said fire-bowl.

12. A fire-bowl for liquid or gaseous fuel burners, comprising an inner open-topped hemispherical bowl, an outer like-shaped larger bowl disposed concentrically therewith to form an intervening water-chamber, a rim common to both bowls and of greater outer diameter than the outer bowl to form a suspension flange thereon and having vertical openings communicable with said water-chamber.

13. A fire-bowl for liquid or gaseous fuel burners, comprising an inner hemispherical open bowl, a larger like shaped bowl disposed concentrically therewith to inclose a water-chamber therebetween, an integral rim common to both bowls and having openings communicable with said water-chamber.

In testimony whereof I have affixed my signature in presence of two witnesses.

ARTHUR W. FEES.

Witnesses:
F. H. MATTHISEN,
B. MUMMERT.